Sept. 8, 1964  A. I. DRANETZ ET AL  3,148,290

ELECTRO-MECHANICAL TRANSDUCER

Original Filed April 19, 1955  2 Sheets-Sheet 1

INVENTORS.
Abraham I. Dranetz
Hugh J. Cullin
By: Wallenstein, Spangenberg & Hattis  attys INVENTORS
Abraham I. Dranetz
Hugh J. Cullin `United States Patent Office`

3,148,290
Patented Sept. 8, 1964

3,148,290
ELECTRO-MECHANICAL TRANSDUCER
Abraham I. Dranetz and Hugh J. Cullin, Metuchen, N.J., assignors to Gulton Industries, Inc., Metuchen, N.J., a corporation of New Jersey
Original application Apr. 19, 1955, Ser. No. 502,459, now Patent No. 2,967,956, dated Jan. 10, 1961. Divided and this application Dec. 27, 1960, Ser. No. 78,657
10 Claims. (Cl. 310—8.4)

This application is a division of our copending application Serial No. 502,459, filed April 19, 1955, for Transducer, now Patent No. 2,967,956, issued January 10, 1961.

Our invention relates to electro-mechanical transducers and in particular to those ceramic electro-mechanical transducers which employ a vibrating disc which is excited in a bending or flexural mode of resonance.

Generally, ceramic underwater sound transducers have been of the form of either flat discs or hollow cylinders. These vibrating systems will vibrate at the largest amplitude when they are excited at one of their resonant frequencies (fundamental or harmonic). The common modes of resonance utilized in disc transducers are the radial and the thickness modes and those utilized in cylindrical transducers are the radial and length modes. Disc transducers vibrating in radial and thickness mode possess an inherently high Q, and cylindrical transducers increase in size as the resonant frequency is lowered. Since it is desirable to obtain transducers of reasonable size with low resonant frequencies, we propose to utilize the flexural vibrational modes of disc transducers.

Accordingly, it is a principal object of our invention to provide a disc-shaped ceramic transducer capable of being excited in flexural modes.

It is a further object of our invention to provide a disc-shaped ceramic transducer which is easily manufactured and produced.

It is a still further object of our invention to provide an economical disc-shaped transducer of low resonant frequency and low Q.

It is a still further object of our invention to provide a mass-loaded disc-shaped ceramic transducer capable of being excited in flexural modes.

A further object of our invention is to provide a disc-shaped transducer having radial slots in the periphery thereof for relieving compressional forces thereat during flexing of the same to provide still lower resonant frequency and Q.

Other objects and advantages of our invention will be apparent during the course of the following description.

Figure 1:
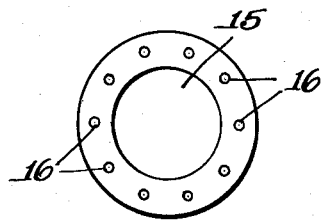
Figure 3:
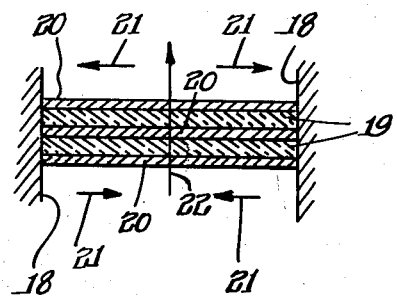
Figure 2:
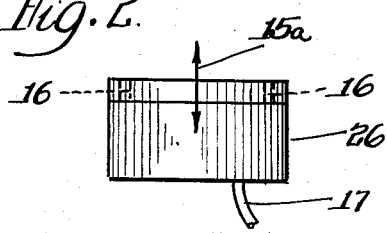
Figure 4:
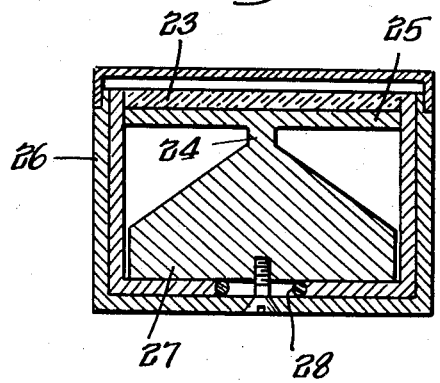
Figure 5:
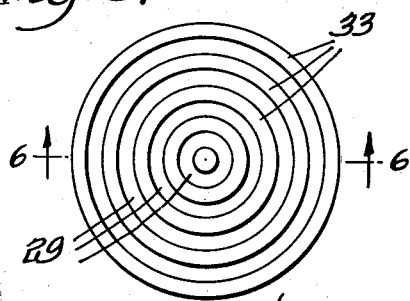
Figure 7:
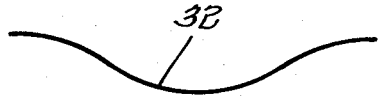
Figure 6:
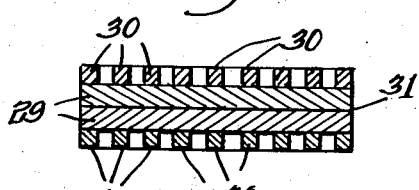
Figure 8:
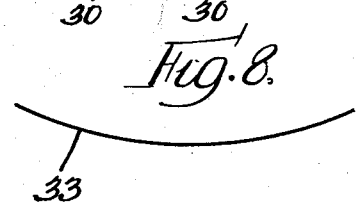
Figure 9:
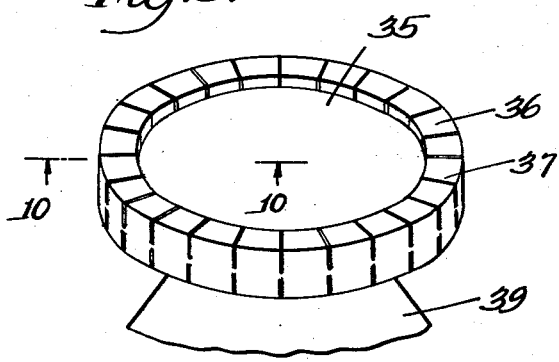
Figure 10:
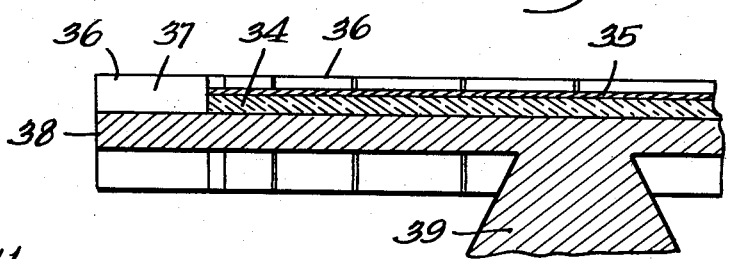

In the accompanying drawings, forming a part of this application, and in which like numerals are employed to designate like parts throughout the same, FIGURE 1 is a plan view of an embodiment of our invention, FIGURE 2 is a side elevation of the embodiment of FIGURE 1, FIGURE 3 is utilized to illustrate the stresses in a transducer which is excited in flexural mode, FIGURE 4 is a cross-sectional view of a further embodiment of our invention, FIGURE 5 is a plan view of a further embodiment of our invention, FIGURE 6 is a cross-sectional view along the line 6—6 of FIGURE 5, FIGURE 7 is a stress curve of an edge-clamped disc transducer, FIGURE 8 is a stress curve of an edge-supported or center-supported disc transducer, FIGURE 9 is a perspective view of a further embodiment of our invention, illustrating a method of mass loading, FIGURE 10 is a cross-sectional view along the line 10—10 of FIGURE 9.

Figure 11:
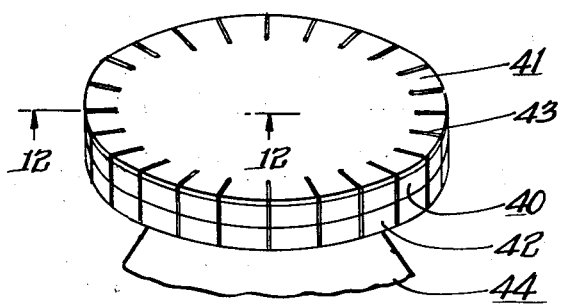
Figure 12:
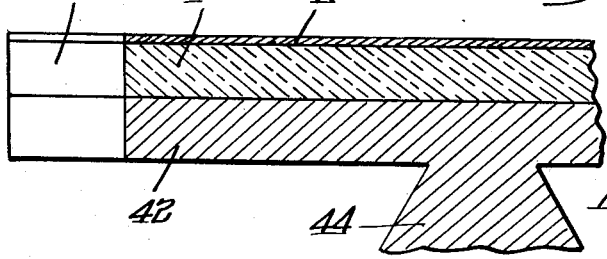

FIGURE 11 is a perspective view of a further embodiment of our invention, illustrating another method of mass loading, and FIGURE 12 is a cross-sectional view along the line 12—12 of FIGURE 11.

The embodiments of our invention described and illustrated herein utilize ceramic transducers of the titanates and in particular those which are made largely of barium titanate or the like. Our invention applies equally as well to flat-plate transducers of any shape, such as squares, rectangles, circles, ellipses, etc. which are capable of being excited in flexural mode. For convenience of expression, the term "disc" is used to include such various shaped flat plates. Materials which are either piezoelectric, magnetostrictive, electrostrictive or the like are suitable to carry out our invention and may be employed as the active piezo-sensitive material of the transducers produced in accordance with this invention.

The embodiment of our invention illustrated in FIGURES 1 and 2 may utilize either two active piezo-sensitive elements in the sandwich construction of FIGURE 3 or an active piezo-sensitive element backed by a piezo-sensitively inert disc such as are illustrated in FIGURES 4, 9 and 11. All of the embodiments of our invention may be constructed of either type of transducer. In FIGURES 1 and 2 a piezo-sensitive element 15 is secured by a ring and clamping screws 16 to a case 26 so as to be edge-supported or peripherally clamped in place. An electric cable 17 makes connection to the piezo-sensitive element for applying electrical energy thereto for vibrating the same or for transmitting electrical signals due to the vibration of the piezo-sensitive element. When the unit is excited, the center of the piezo-sensitive element 15 will move in the direction 15a as illustrated in FIGURE 2.

FIGURE 3 serves to illustrate this action wherein the transducer is comprised of two active elements 19 with electrodes 20 on each outer face and between the two separate active elements 19 suitably bonded or otherwise fixedly attached to the surfaces of the active elements 19. The numeral 18 designates the clamping surfaces for the transducer, the numeral 21 designates the directions of element stress, and the numeral 22 designates the resultant direction of motion. The electrodes 20 are electrically connected so that an applied voltage will cause the active elements 19 to stress in the direction indicated by the arrows 21 and as a result the motion of the center of the transducer will be in the direction shown by the arrow 22. When the directions of arrows 21 are reversed, due to the application of an opposite voltage, the direction of the arrow 22 will likewise be reversed. The flexing of the transducer along the line of the arrow 22 will occur at the frequency of the applied voltage. In like manner, if the transducer is mechanically or acoustically flexed along the line of arrow 22, the voltage produced will be of the same frequency or time dependence as the applied stress. If the two active elements 19 are polarized in series, then they should be driven in parallel, while, if the two active elements are polarized in parallel, then they should be driven in series. The curve 32 in FIGURE 7 designates the stress curve of an edge-shaped disc transducer and the curve 33 in FIGURE 8 designates the stress curve of an edge-supported disc transducer or a center-supported disc transducer.

In water, utilization of the flexural mode of vibration produces a broad peak if output is plotted against frequency, whereas the other modes of vibration produce much sharper peaks. The optimum mechanical, Q, for a transducer of a given size may be attained by suitable mass-loading of the transducer. This may be accomplished by varying the loading masses in size, position or both. Control over the acoustic coupling of the transducer may also be attained by selective isolation of portions of the transducer face which are operating out of phase with the major portion of the face.

FIGURE 4 illustrates a unit produced in accordance with our inventiton wherein the active element 23, provided with electrodes, is backed by a piezo-electrically inert backing 25 to which it is securely and uniformly bonded, the whole assembly being center-supported by support 24 which is mass backed by a mass 27. The complete unit is enclosed in case 26 and sealed by sealing ring 28. When the active element 23 is electrically energized, the plane surface of 23 tends to shrink and grow in accordance with the frequency of the applied exciting energy. This motion of the active element 23 is resisted by inert disc 25, thus causing the combined unit 23–25 to vibrate in the flexural mode about its center-support 24 as illustrated by the curve 23 in FIGURE 8. The output of this type of transducer is lower than the output of a similarly sized unit containing two elements such as is illustrated in FIGURE 3 but it is simpler to construct and machine especially since the mounting arrangement and mass backing may be constructed of the same piece as the inert backing. If center supporting is desired, such as is illustrated in FIGURE 3, the metal may be turned so that the disc portion resembles the head of a mushroom supported on a stem. When this is backed with sufficient mass 27, the disc is free to vibrate flexurally with a fixed center point. If edge clamping is employed, the metal disc is made so that clamping space is provided on the outside rim and the center is free to vibrate. The unit illustrated in FIGURES 5 and 6 utilizes rings of electrodes 30 on the active elements 29 which are joined together at 31. The spacing between these electrode rings 30 is preferably larger than the thickness of the electrode elements 29. This illustrated embodiment shows electrodes on both surfaces of the active elements 29 but, however, the electrodes may be mounted on one surface only or a single active element may be employed in lieu of the two active elements illustrated. In all such arrangements the elements will be excited in the flexural mode.

FIGURES 9 and 10 illustrate a further embodiment of our invention wherein a piezo-sensitive ceramic element 34 is suitably bonded to an electrode 35 and is backed by a piezo-sensitively inert metallic element 38 which is center-supported by a center support 39. These elements 38 and 39 may be of the forms described in the description of the embodiment of FIGURE 4. The outer ring 36 on the metal disc 38 serves to mass load the transducer and it may be of the same material and turned from the same piece as the disc 38 and center support 39, or all three elements may be of different materials or the same material individually fabricated and suitably and appropriately attached or fastened together. The upper and lower portions of the ring 36 are provided with a plurality of radially arranged slots 37 which serve to relieve compression in outer ring 36 when the transducer vibrates flexurally. This mass ring and the slots 37 therein operate to provide low resonant frequency and controlled Q.

FIGURES 11 and 12 illustrate a further embodiment of our invention wherein a ceramic-metal sandwich comprising a piezo-sensitive element 40 which is suitably bonded to an electrode 41 and to a metallic disc 42 is utilized. The metallic disc 42 is center-supported on a support 44. Here the piezo-sensitive element 40 and its metal disc 42 are peripherally provided with a plurality of radial slots 43. These slots 43 operate as the slots 37 in FIGURES 9 and 10 to serve to relieve compressional forces in the transducer when the transducer is vibrated flexurally so as to provide low resonant frequency and controlled Q.

In the embodiment of both FIGURES 9 and 11, the metallic elements 38 and 42 may be replaced by active piezo-sensitive ceramic elements such as is illustrated in FIGURE 3. When ceramic-ceramic sandwiches are employed, a second electrode must be used on the lower face of the element which replaces either of the elements 38 or 42. If elements 38 and 42 are metallic, as illustrated, they may be machined from the same pieces as 39 and 44 or the elements may be of separate pieces and suitably affixed together. Sufficient mass backing, such as is shown in FIGURE 4, may also be employed in the embodiments of FIGURES 9 and 11 and the center support structures 39 and 44 may be similar to the center support structure 44 of FIGURE 4.

While we have described our invention by means of specific examples and in specific embodiments, we do not wish to be limited thereto, for obvious modifications thereto may well occur to those skilled in the art without departing from the scope of the appended claims.

We claim as our invention:

1. An electro-mechanical transducer comprising, a substantially disc-shaped member including at least one substantially disc-shaped piezo-sensitive element provided with electrodes, means for supporting said substantially disc-shaped member for vibration in flexural mode, means for applying flexing forces to the substantially disc-shaped member for flexing the same substantially uniformly about its center, as into and out of umbrella shape, and said substantially disc-shaped member having radial slots in the periphery thereof for relieving compressional forces thereat during flexing of the substantially disc-shaped member.

2. An electro-mechanical transducer comprising, a substantially disc-shaped member including at least one substantially disc-shaped piezo-sensitive element commensurate with the substantially disc-shaped member and provided with electrodes, means for supporting said substantially disc-shaped member for vibration in flexural mode, means for applying flexing forces to the substantially disc-shaped member for flexing the same substantially uniformly about its center, as into and out of umbrella shape, and said substantially disc-shaped member including its commensurate substantially disc-shaped piezo-sensitive element having radial slots in the periphery thereof for relieving compressional forces thereat during flexing of the substantially disc-shaped member.

3. An electro-mechanical transducer comprising, a substantially disc-shaped member having a peripheral mass and including at least one substantially disc-shaped piezo-sensitive element provided with electrodes, means for supporting said substantially disc-shaped member for vibration in flexural mode, means for applying flexing forces to the substantially disc-shaped member for flexing the same substantially uniforming about its center, as into and out of umbrella shape, and said peripheral mass of said substantially disc-shaped member having radial slots for relieving compressional forces thereat during flexing of the substantially disc-shaped member.

4. An electro-mechanical transducer comprising, a substantially disc-shaped member including at least one substantially disc-shaped piezo-sensitive element provided with electrodes, a support secured at right angles to the center of the substantially disc-shaped member and having transverse dimensions appreciably less than the planar dimensions of the substantially disc-shaped member for supporting the center portion of the substantially disc-shaped member, means for applying flexing forces to the substantially disc-shaped member for flexing the same substantially uniformly about its center, as into and out of umbrella shape, and said substantially disc-shaped member having radial slots in the periphery thereof for relieving compressional forces thereat during flexing of the substantially disc-shaped member.

5. An electro-mechanical transducer comprising, a substantially disc-shaped member including at least one substantially disc-shaped piezo-sensitive element commensurate with the substantially disc-shaped member and provided with electrodes, a support secured at right angles to the center of the substantially disc-shaped member and having transverse dimensions appreciably less than the planar dimensions of the substantially disc-shaped member for supporting the center portion of the substantially disc-shaped member, means for applying flexing forces to the substantially disc-shaped member for flexing the same substantially uniformly about its center, as into and out of umbrella shape, and said substantially disc-shaped member including its commensurate substantially disc-shaped piezo-sensitive element having radial slots in the periphery thereof for relieving compressional forces thereat during flexing of the substantially disc-shaped member.

6. An electro-mechanical transducer comprising, a substantially disc-shaped member having a peripheral mass and including at least one substantially disc-shaped piezo-sensitive element provided with electrodes, a support secured at right angles to the center of the substantially disc-shaped member and having transverse dimensions appreciably less than the planar dimensions of the substantially disc-shaped member for supporting the center portion of the substantially disc-shaped member, means for applying flexing forces to the substantially disc-shaped member for flexing the same substantially uniformly about its center, as into and out of umbrella shape, and said peripheral mass of said substantially disc-shaped forces having radial slots for relieving compressional forces thereat during flexing of the substantially disc-shaped member.

7. An electro-mechanical transducer for converting mechanical energy into an electrical signal comprising, a substantially disc-shaped member including at least one substantially disc-shaped piezo-sensitive member provided with electrodes, means for supporting said substantially disc-shaped member for vibration in flexural mode, means for applying mechanical flexing forces to the substantially disc-shaped member for flexing the same substantially uniformly about its center, as into and out of umbrella shape, for producing corresponding electrical signals at said electrodes, and said substantially disc-shaped member having radial slots in the periphery thereof for relieving compressional forces thereat during flexing of the substantially disc-shaped member.

8. An electro-mechanical transducer for converting electrical energy to mechanical energy comprising, a substantially disc-shaped member including at least one substantially disc-shaped piezo-sensitive member provided with electrodes, means for supporting said substantially disc-shaped member for vibration in flexural mode, means for applying electrical energy to said electrodes for flexing the substantially disc-shaped member substantially uniformly about its center, as into and out of umbrella shape, for producing corresponding mechanical energy, and said substantially disc-shaped member having radial slots in the periphery thereof for relieving compressional forces thereat during flexing of the substantially disc-shaped member.

9. An electro-mechanical transducer for converting mechanical energy into an electrical signal comprising, a substantially disc-shaped member including at least one substantially disc-shaped piezo-sensitive member provided with electrodes, a support secured at right angles to the center of the substantially disc-shaped member and having transverse dimensions appreciably less than the planar dimensions of the substantially disc-shaped member for supporting the center portion of the substantially disc-shaped member, means for applying mechanical flexing forces to the substantially disc-shaped member for flexing the same substantially uniformly about its center, as into and out of umbrella shape, for producing corresponding electrical signals at said electrodes, and said substantially disc-shaped member having radial slots in the periphery thereof for relieving compressional forces thereat during flexing of the substantially disc-shaped member.

10. An electro-mechanical transducer for converting electrical energy to mechanical energy comprising, a substantially disc-shaped member including at least one substantially disc-shaped piezo-sensitive member provided with electrodes, a support secured at right angles to the center of the substantially disc-shaped member and having transverse dimensions appreciably less than the planar dimensions of the substantially disc-shaped member for supporting the center portion of the substantially disc-shaped member, means for applying electrical energy to said electrodes for flexing the substantially disc-shaped member substantially uniformly about its center, as into and out of umbrella shape, for producing corresponding mechanical energy, and said substantially disc-shaped member having radial slots in the periphery thereof for relieving compressional forces thereat during flexing of the substantially disc-shaped member.

References Cited in the file of this patent
UNITED STATES PATENTS

| | | |
|---|---|---|
| 2,487,962 | Arndt | Nov. 15, 1949 |
| 2,808,522 | Dranetz | Oct. 1, 1957 |
| 2,956,184 | Pollack | Oct. 11, 1960 |